US011755341B2

United States Patent
Wang et al.

(10) Patent No.: US 11,755,341 B2
(45) Date of Patent: Sep. 12, 2023

(54) CLASS LOADING METHOD AND APPARATUS

(71) Applicant: HUAWEI TECHNOLOGIES CO., LTD., Shenzhen (CN)

(72) Inventors: Xinjian Wang, Hangzhou (CN); Qinghua Zhang, Shenzhen (CN); Yongyong Yang, Beijing (CN); Bin Zhang, Hangzhou (CN); Wei Liu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 88 days.

(21) Appl. No.: 17/484,137

(22) Filed: Sep. 24, 2021

(65) Prior Publication Data
US 2022/0012067 A1 Jan. 13, 2022

Related U.S. Application Data

(63) Continuation of application No. PCT/CN2020/081220, filed on Mar. 25, 2020.

(30) Foreign Application Priority Data

Mar. 25, 2019 (CN) .......................... 201910229643.6

(51) Int. Cl.
G06F 8/41 (2018.01)
G06F 9/445 (2018.01)

(52) U.S. Cl.
CPC ............ G06F 9/44521 (2013.01); G06F 8/41 (2013.01)

(58) Field of Classification Search
CPC ................................ G06F 9/44521; G06F 8/41
(Continued)

(56) References Cited

U.S. PATENT DOCUMENTS 6,158,045 A * 12/2000 You ...................... G06F 11/3664
717/124
6,973,646 B1 * 12/2005 Bordawekar ....... G06F 9/45516
713/168

(Continued)

FOREIGN PATENT DOCUMENTS

CN 101763257 A 6/2010
CN 101968795 A 2/2011
(Continued)

OTHER PUBLICATIONS

Title: Beyond kernel-level integrity measurement: enabling remote attestation for the android platform, author: M Nauman et al., published on 2010.*

(Continued)

Primary Examiner — Chameli Das
(74) Attorney, Agent, or Firm — Rimon PC

(57) ABSTRACT

This application discloses a class loading method and apparatus. The method is applied to a computer device, the computer device includes a target binary file, the target binary file includes a correspondence between class names of a plurality of classes and full information of the plurality of classes, and the class names are in a one-to-one correspondence with the full information of the classes. The method includes: determining a class name of a to-be-loaded class required for running an application program in the computer device; obtaining full information corresponding to the class name of the to-be-loaded class based on the class name of the to-be-loaded class and the correspondence between the class names of the plurality of classes and the full information of the plurality of classes; and running the application program based on the full information corresponding to the class name of the to-be-loaded class.

17 Claims, 8 Drawing Sheets

(58) Field of Classification Search
USPC ........................................................ 717/162
See application file for complete search history.

(56) References Cited

U.S. PATENT DOCUMENTS

| | | | |
|---|---|---|---|
| 2002/0129177 A1* | 9/2002 | McGuire | G06F 9/44521 719/310 |
| 2004/0143826 A1 | 7/2004 | Gissel et al. | |
| 2007/0011723 A1 | 1/2007 | Chao | |
| 2007/0113234 A1 | 5/2007 | Chinnappa et al. | |
| 2009/0172648 A1 | 7/2009 | Gerginov et al. | |
| 2011/0067038 A1 | 3/2011 | Troccoli et al. | |
| 2013/0290927 A1 | 10/2013 | Steidl et al. | |
| 2015/0301840 A1* | 10/2015 | Goetz | G06F 9/449 717/166 |
| 2016/0070557 A1* | 3/2016 | Yamada | G06F 8/65 717/172 |
| 2016/0274900 A1 | 9/2016 | Raundahl Gregersen et al. | |

FOREIGN PATENT DOCUMENTS

| | | |
|---|---|---|
| CN | 102402427 A | 4/2012 |
| CN | 102567033 A | 7/2012 |
| CN | 103123593 A | 5/2013 |
| CN | 103246525 A | 8/2013 |
| CN | 103647636 A | 3/2014 |
| CN | 103984548 A | 8/2014 |
| CN | 104199955 A | 12/2014 |
| CN | 104268159 A | 1/2015 |
| CN | 104657258 A | 5/2015 |
| CN | 104764464 A | 7/2015 |
| CN | 105608219 A | 5/2016 |
| CN | 105630870 A | 6/2016 |
| CN | 105760407 A | 7/2016 |
| CN | 105955765 A | 9/2016 |
| CN | 106528255 A | 3/2017 |
| CN | 107291480 A | 10/2017 |
| CN | 108279940 A | 7/2018 |
| EP | 2615544 A1 | 7/2013 |

OTHER PUBLICATIONS

Title: Execute this! analyzing unsafe and malicious dynamic code loading in android applications. Author: S Poeplau et al, published on 2014.*

* cited by examiner

CLASS LOADING METHOD AND APPARATUS

CROSS-REFERENCE TO RELATED APPLICATIONS

This application is a continuation of International Application No. PCT/CN2020/081220, filed on Mar. 25, 2020, which claims priority to Chinese Patent Application No. 201910229643.6, filed on Mar. 25, 2019. The disclosures of the aforementioned applications are hereby incorporated by reference in their entireties.

TECHNICAL FIELD

This application relates to the field of computer technologies, and in particular, to a class loading method and apparatus.

BACKGROUND

In a JAVA virtual machine (JVM) framework, a JAVA virtual machine loads byte code, namely, a .class file, that describes class data in a magnetic disk into a memory, corrects, converts, parses, and initializes the data, and finally generates a JAVA class that can be directly used by the JVM. This is a class loading mechanism of a standard JVM.

Starting from Android 5.0, Google has opened an Art running mode. Based on the Art running mode, a system service process and each application run on an independent Art instance. When a system service process or an application runs, if class information (class info) of a class needs to be loaded, a class definition is first found based on a class name of the class, then a memory is dynamically allocated, class data is loaded, and information such as a class attribute and a method is filled through dynamic linking. The class data is information used to describe a class, for example, a quantity of methods included in the class. The class information includes the class attribute, the method, and the like.

In the foregoing technical solution, a class definition of a to-be-loaded class is usually first searched for based on a class name of the to-be-loaded class, and then data and other information of the to-be-loaded class are dynamically loaded. Consequently, it takes a relatively long time to load the class.

SUMMARY

Embodiments of this application provide a class loading method and apparatus, to accelerate class loading, thereby shortening duration required for class loading.

According to a first aspect, an embodiment of this application provides a class loading method, applied to a computer device. The computer device includes a target binary file, the target binary file includes a correspondence between class names of a plurality of classes and full information of the plurality of classes, and the class names are in a one-to-one correspondence with the full information of the classes. The target binary file may be, for example, a Dex file, an Oat file, or a shared dynamic library (also refer to as shared object, SO) file. The method includes: first determining a class name of a to-be-loaded class required when an application program in the computer device runs, where the application program may be, for example, a system service process or any application installed on the computer device, the to-be-loaded class may be a class to which any method required for running the application program belongs, and a time when an application program runs may be, for example, a moment of an application program start phase or a moment of an application program running phase; then searching the class names of the plurality of classes for the class name of the to-be-loaded class based on the correspondence between the class names of the plurality of classes and the full information of the plurality of classes, and obtaining full information corresponding to the class name of the to-be-loaded class, where the plurality of classes include a first class, and the first class may be any one of the plurality of classes, and full information of the first class is all information required for running the first class, for example, all the information may include a class name, a class definition, a class attribute, and a method of the first class; and subsequently running the application program based on the full information corresponding to the class name of the to-be-loaded class.

It can be learned that a process of loading a class in the technical solution provided in some embodiments of this application is essentially a process of searching for a class name to obtain full information corresponding to the class name. In comparison with a technical solution of "first searching for a class definition based on a class name and then dynamically loading data and other information of a class" in the conventional technology, in the technical solution provided in some embodiments of this application, full information of a class may be directly found based on a class name, so that class loading is accelerated, thereby shortening a duration required for class loading.

In a possible design, the target binary file further includes class addresses of the plurality of classes and a correspondence between the class addresses of the plurality of classes and hash values of the class names of the plurality of classes, and storage space indicated by a class address of a class is used to store full information of the class. The class address may be generated in a static compilation (such as ahead of time compilation) phase. For example, when the target binary file is an SO file, the class address may be generated in the static compilation phase in a process of generating an SO file based on a Dex file. Correspondingly, the method further includes: searching the hash values of the class names of the plurality of classes for a target hash value based on the correspondence between the class addresses of the plurality of classes and the hash values of the class names of the plurality of classes, and obtaining a class address corresponding to the target hash value, where the target hash value is a hash value of the class name of the to-be-loaded class. Based on this, the searching the class names of the plurality of classes for the class name of the to-be-loaded class based on the correspondence between the class names of the plurality of classes and the full information of the plurality of classes, and obtaining full information corresponding to the class name of the to-be-loaded class may include: searching, for the class name of the to-be-loaded class, storage space indicated by the class address corresponding to the target hash value, where the class name of the to-be-loaded class is a part of the full information of the to-be-loaded class; and using, as the full information of the to-be-loaded class, full information in the storage space indicated by the class address corresponding to the target hash value.

It can be learned that in some embodiments of this application, the class name of the to-be-loaded class can be searched for through addressing, so that the class name of the to-be-loaded class can be quickly found from the class names of the plurality of classes.

In a possible design, one hash value corresponds to one bucket (that is, one hash bucket), and one bucket includes zero, one, or more class addresses. Correspondingly, the searching the hash values of the class names of the plurality of classes for a target hash value based on the correspondence between the class addresses of the plurality of classes and the hash values of the class names of the plurality of classes, and obtaining a class address corresponding to the target hash value may include: searching the hash values of the class names of the plurality of classes for the target hash value based on a correspondence between a plurality of buckets and the hash values of the class names of the plurality of classes, obtaining a bucket corresponding to the target hash value, and using, as the class address corresponding to the target hash value, a class address included in the bucket corresponding to the target hash value. It can be learned that this embodiment of this application supports a manner of using a hash bucket, so that a collision rate can be reduced.

In an implementation, a quantity of buckets is determined in the static compilation phase. Optionally, a class address included in each bucket (that is, a correspondence between the bucket and the class address) is determined in the static compilation phase. In other words, in an embodiment of this application, the quantity of buckets and the class address included in each bucket can be statically determined. In another implementation, a quantity of buckets is determined in the application program start phase or running phase. Optionally, a class address included in each bucket is determined in the application program start phase or running phase. In other words, in an embodiment of this application, the quantity of buckets and the class address included in each bucket can be dynamically determined.

In a possible design, one bucket has one start address and one end address, the plurality of buckets include a first bucket, and the first bucket may be any one of the plurality of buckets. Storage space defined by a start address and an end address of the first bucket is used to store a class address included in the first bucket. Correspondingly, before the using, as the class address corresponding to the target hash value, a class address included in the bucket corresponding to the target hash value, the method may further include: searching start addresses and end addresses of the plurality of buckets for a start address and an end address of the bucket corresponding to the target hash value; and reading, from storage space defined by the start address and the end address of the bucket corresponding to the target hash value, the class address included in the bucket corresponding to the target hash value. This possible design provides an implementation of determining a class address. Certainly, this application is not limited thereto in specific implementation.

In a possible design, before the determining a class name of a to-be-loaded class required when an application program in the computer device runs, the method further includes: loading binary files required for running the application program from an external storage of the computer device into a memory of the computer device. The external storage of the computer device may be, for example, a hard disk or a magnetic disk. The external storage of the computer device may be configured to store a binary file generated in the static compilation phase. The binary files include the target binary file. For example, when the target binary file is an SO file, the binary files required for running the application program herein may be all SO files required for running the application program. For another example, when the target binary file is a Dex file, the binary files required for running the application program herein may be all Dex files required for running the application program. Optionally, the process may occur in the application program start phase. Based on this possible design, during class loading, the computer device (specifically, a CPU of the computer device) may search the binary files in the memory for the full information of the to-be-loaded class, so that class loading can be accelerated, thereby shorting duration required for class loading.

In a possible design, the method further includes: creating at least two class loaders of the application program; and establishing a correspondence between the at least two class loaders and all the binary files. For example, one class loader may correspond to one or more binary files, the at least two class loaders include a first class loader, and the first class loader may be any one of the at least two class loaders. The first class loader is used to search, for the full information of the to-be-loaded class, a binary file corresponding to the first class loader. Optionally, the process may occur in the application program start phase or running phase. Based on this possible design, during class loading, the computer device may search a corresponding binary file for the full information of the to-be-loaded class based on a class loader.

In a possible design, the method further includes: determining a class loader currently performing a search operation from the at least two class loaders based on a parents delegation model, to search all the binary files for the full information of the to-be-loaded class by using the determined class loader currently performing a search operation.

In a possible design, that a correspondence exists between a class loader and a binary file includes that a correspondence exists between the class loader and a path of the binary file. The path of the binary file may be considered as a specific implementation of identification information of the binary file. Correspondingly, the method further includes: searching, based on a correspondence between the at least two class loaders and paths of all the binary files, the paths of all the binary files for a path of a binary file in which a target stack frame is located, obtaining a class loader corresponding to the path of the binary file in which the target stack frame is located, and using the determined class loader as an initial class loader to be used in the parents delegation model, where the target stack frame is a stack frame for calling a to-be-loaded method, and the to-be-loaded method belongs to the to-be-loaded class. It can be learned that this embodiment of this application supports a technical solution of using the class loader corresponding to the path of the binary file in which the target stack frame for calling the to-be-loaded method is located to determine the initial class loader to be used in the parents delegation model.

In a possible design, the method further includes: establishing a correspondence between the at least two class loaders and classes in all the binary files, where a correspondence exists between the first class loader and a class included in the binary file corresponding to the first class loader; and using, as an initial class loader to be used in the parents delegation model, a class loader corresponding to a class currently calling the to-be-loaded class. In this way, class loading performance is improved.

According to a second aspect, an embodiment of this application provides a class loading apparatus, and the apparatus includes modules configured to perform the class loading method in any one of the first aspect and the possible designs of the first aspect. The apparatus may be, for example, a computer device or a chip.

According to a third aspect, an embodiment of this application provides a class loading apparatus. The apparatus includes a storage and a processor, the storage is configured to store computer executable instructions, and when the apparatus runs, the processor executes the computer executable instructions in the storage to perform the operation steps of the method in any one of the first aspect and the possible designs of the first aspect by using a hardware resource in the apparatus. The apparatus may be, for example, a computer device or a chip.

According to a fourth aspect, an embodiment of this application provides a computer-readable storage medium. The computer-readable storage medium stores computer programs, and when the computer programs run on a computer, the computer performs in any one of the first aspect and the possible designs of the first aspect.

According to a fifth aspect, an embodiment of this application provides a computer program product. When the computer program product runs on a computer, operation steps of any possible method in any one of the first aspect and the possible designs of the first aspect are performed.

It may be understood that either class loading apparatus, the computer-readable storage medium, and the computer program product provided above are configured to perform the corresponding method provided above. Therefore, for beneficial effects that can be achieved by the either class loading apparatus, the computer-readable storage medium, and the computer program product, refer to beneficial effects in the corresponding method. Details are not described herein again.

DESCRIPTION OF EMBODIMENTS

Figure 1:
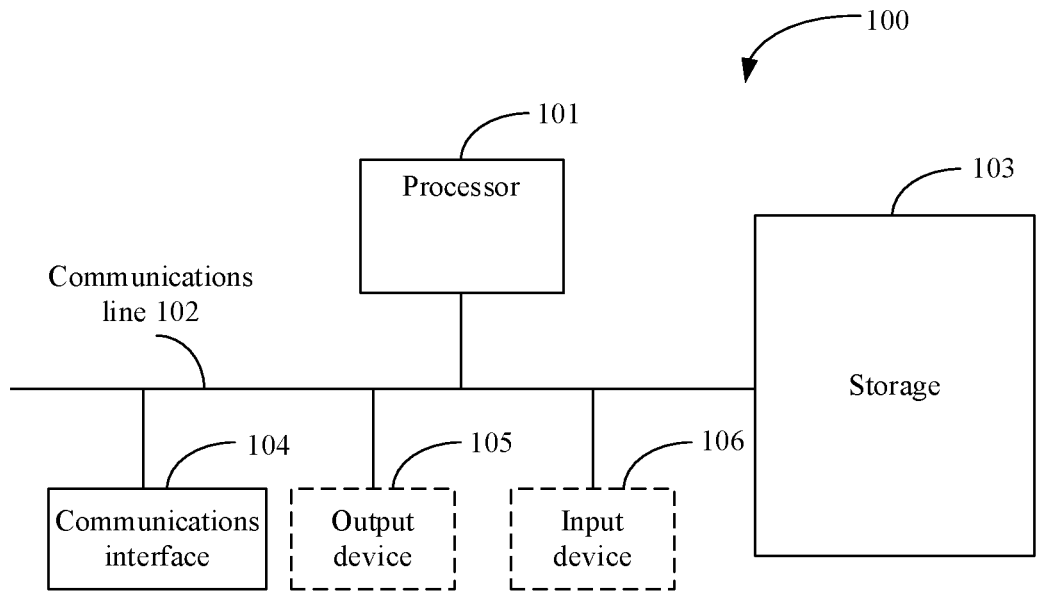
FIG. 1 is a schematic diagram of a hardware structure of a computer device applicable to the embodiments of this application.

First, terms used in the embodiments of this application are briefly described, to help readers have a better understanding.

Class: The class is an abstract data type, and is abstraction of entities with a same feature. Generally, the class described in the embodiments of this application is a java class. For example, it may be considered that one class is a set of a plurality of attributes and methods.

Class information: Class information of a class may include a class name, a class definition, a class attribute, a method, and the like of the class.

Full information of a class: Full information of a class is all information required for executing the class. For example, full information of a class includes all class information of the class, for example, a class name, a class definition, a class attribute, a method, and visibility of the attribute and the method.

For example, full information of a class may include various types of information shown in Table 1.

TABLE 1

| Full information of a class | Description |
| --- | --- |
| shadow | Used to indicate a type of the class: java/lang/class |
| clindex | Used to indicate a corresponding class loader field |
| sizeinfo | Used to indicate a memory occupation size of the class and an object of the class |
| itab | Used to indicate information about an interface method of the class |
| vtab | Used to indicate information about a virtual method of the class |
| classname | Used to indicate a class name |
| fields | Used to indicate all member variable information, including a static variable and an instance variable |
| methods | Used to indicate all member method information |
| superclasses | Used to indicate all super class information, including information about an implemented interface |
| initstate | Used to indicate whether this class is initialized |

It should be understood that the various types of information shown in Table 1 are only an example of full information of a class. In actual implementation, full information of a class may include more or less information than the information shown in Table 1.

Class loader (class loader): The class loader is a logical unit that loads a JAVA class into a virtual machine.

Binary file: A binary file in a broad sense is a file that is stored in an external device in a binary format. A binary file in a narrow sense is a file other than a text file. A Dex file, an Oat file, and an SO file all belong to binary files. An example in which binary files described below are SO files is used for description, unless otherwise stated. The Dex file is a target file in an Android virtual machine, and includes all operation instructions of an application program and data required when the application program runs. The Oat file is an executable file obtained after static (ahead of time, AOT) compilation and optimization are performed on the Dex file. The Oat file may be generated by an AOT compiler through compilation. The SO file is a file in an executable and linking format (ELF), and is also referred to as a dynamic library file or a shared library file.

Bucket (bucket): The bucket is also referred to as a hash bucket, and is a virtual subgroup of elements in a bucket table. Elements in a same bucket correspond to a same hash value, and elements in different buckets correspond to different hash values. In some embodiments of this application, an element in a bucket may be a class address.

The term "at least one" in the embodiments of this application includes one or more. "A plurality of" means two or more. For example, at least one of A, B, and C includes: Only A exists, only B exists, both A and B exist, both A and C exist, both B and C exist, and all of A, B, and C exist. In description of this application, "/" means "or" unless otherwise specified. For example, A/B may represent A or B. In this specification, "and/or" describes only an association relationship between associated objects and represents that three relationships may exist. For example, A and/or B may represent the following three cases: Only A exists, both A and B exist, and only B exists. "A plurality of" means two or more. In addition, to clearly describe the technical solutions in the embodiments of this application, terms such as "first" and "second" are used in the embodiments of this application to distinguish between same items or similar items that have basically the same functions and purposes. A person skilled in the art may understand that the terms such as "first" and "second" do not limit a quantity or an execution sequence, and the terms such as "first" and "second" do not mean absolutely different either.

FIG. 1 is a schematic diagram of a hardware structure of a computer device 100 applicable to the embodiments of this application. The computer device 100 shown in FIG. 1 includes at least one processor 101, a communications line 102, a storage 103, and at least one communications interface 104.

The processor 101 may be a general-purpose central processing unit (CPU), a microprocessor, an application-specific integrated circuit (ASIC), or one or more integrated circuits for controlling program execution of the solutions of this application.

The communications line 102 may include a channel transmitting information between the foregoing components.

The communications interface 104 may be any apparatus such as a transceiver, and is configured to communicate with another device or a communications network such as the Ethernet, a radio access network (RAN), or a wireless local area network (WLAN).

The storage 103 may be a read-only memory (ROM), another type of static storage device that can store static information and instructions, a random access memory (RAM), or another type of dynamic storage device that can store information and instructions, or may be an electrically erasable programmable read-only memory (EEPROM), a compact disc read-only memory (CD-ROM), another optical disc storage, an optical disc storage medium (including a compact disc, a laser disc, an optical disc, a digital versatile disc, a Blu-ray disc, and the like), a disk storage medium, another magnetic storage device, or any other medium that can be used to carry or store expected program code in a form of an instruction or a data structure and that can be accessed by a computer. However, this is not limited thereto.

The storage 103 may exist independently, and is connected to the processor 101 through the communications line 102. Alternatively, the storage 103 and the processor 101 may be integrated together. The storage 103 provided in this embodiment of this application may be usually non-volatile. The storage 103 is configured to store computer instructions for executing the solutions of this application, and the processor 101 controls the execution. The processor 101 is configured to execute the computer instructions stored in the storage 103, to implement the method provided in the embodiments of this application.

A type of the computer device 100 is not limited in this embodiment of this application. For example, the computer device 100 may be a general-purpose device including the hardware structure shown in FIG. 1, or may be a dedicated device including the hardware structure shown in FIG. 1.

Optionally, the computer instruction in this embodiment of this application may also be referred to as application program code. This is not specifically limited in this embodiment of this application.

In specific implementation, in an embodiment, the computer device 100 may include a plurality of processors. Each of the processors may be a single-core processor, or may be a multi-core processor. The processor herein may be one or more devices, circuits, and/or processing cores used to process data (for example, a computer program instruction).

In specific implementation, in an embodiment, the computer device 100 may further include an output device 105 and an input device 106. The output device 105 communicates with the processor 101, and may display information in a plurality of manners. For example, the output device 105 may be a liquid crystal display (LCD), a light emitting diode (LED) display device, a cathode ray tube (CRT) display device, or a projector. The input device 106 communicates with the processor 101, and may receive input from a user in a plurality of manners. For example, the input device 106 may be a mouse, a keyboard, a touchscreen device, or a sensing device.

Figure 2:
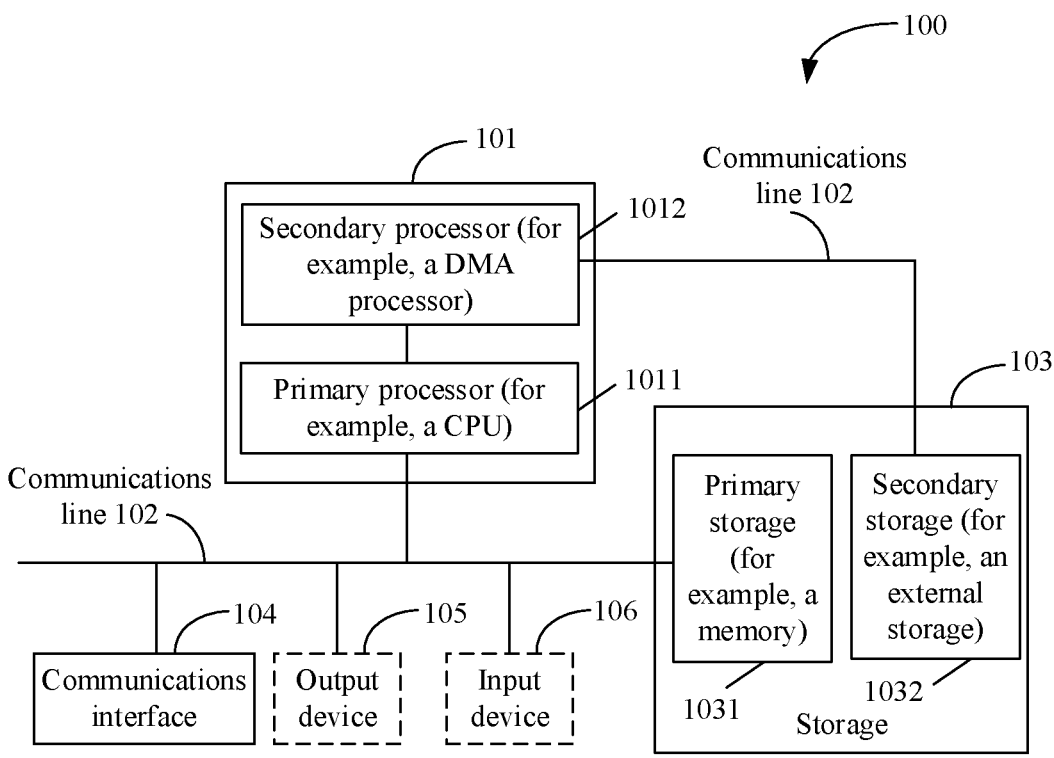
FIG. 2 is a schematic diagram of a hardware structure of another computer device applicable to the embodiments of this application.

In specific implementation, in an embodiment, as shown in FIG. 2, the storage 103 may include a primary storage 1031 and a secondary storage 1032. The processor 101 may include a primary processor 1011 and a secondary processor 1012.

The primary storage 1031 may be a memory.

The secondary storage 1032 may be an external storage, which may also be referred to as an external storage device, for example, may be a hard disk, an optical disc drive, a floppy disk, or a magnetic disk. The secondary storage 1032 may store a binary file (for example, an SO file) obtained through compilation in a static compilation phase.

The primary processor 1011 may be a CPU. The primary processor 1011 cannot directly access the secondary storage 1032 (for example, an external storage), and can access only the primary storage 1031 (for example, a memory).

The secondary processor 1012 may be a processor, for example, a direct memory access (DMA) processor, that can read data from the secondary storage 1032 (for example, an external storage) into the primary storage 1031 (for example, a memory).

For example, the primary processor 1011 is a CPU, the secondary processor 1012 is a DMA processor, the primary storage 1031 is a memory, and the secondary storage 1032 is an external storage. A process of data from the external storage to the memory and then to the CPU may include: The memory sends the CPU an instruction of reading peripherals. The CPU hands system bus control permission over to the DMA processor. The DMA processor reads data from the external storage into the memory. The CPU takes over the bus control permission from the DMA processor. The CPU sends a data read command to the memory. The CPU performs operation processing on the data and performs necessary data exchange with the memory. After the processing ends, if there is a read operation of the external storage, the CPU may send result data to the external storage.

For example, a process of running an application program (including a system service process, an application, or the like) by the computer device 100 may be understood as a process of calling a method by the CPU. The called method belongs to a class. For example, calling a method may be understood as calling a function. Therefore, the DMA processor may first load, into the memory, class information of a class to which a to-be-loaded method stored in the external storage belongs, and the CPU reads the data in the memory to perform the to-be-loaded method.

The technical solutions provided in the embodiments of this application are described below with reference to the accompanying drawings. To clearly describe the technical solutions provided in the embodiments of this application, the following provides descriptions by using a static compilation phase, an application program start phase, and an application program running phase. The class loading method provided in this application may be included in the application program running phase and/or the application program start phase. Therefore, the class loading method is not separately described below.

Static Compilation Phase

In the static compilation phase, a static compiler toolchain compiles a dynamic library, to be specific, compiles a Dex file into an SO file. A specific implementation of compiling the Dex file into the SO file is not limited in this embodiment of this application. For example, refer to the conventional technology. It should be noted that for application to the embodiments of this application, in a process of compiling the Dex file into the SO file, the static compiler toolchain may generate a hash table based on a class name of a class in the Dex file. The hash table is a part of the SO file.

Specifically, for any to-be-compiled Dex file, the static compiler toolchain may separately perform a hash operation on class names of all classes in the to-be-compiled Dex file, to obtain a hash value of each class name, and establish a hash table.

A hash algorithm used to perform a hash operation is not limited in this embodiment of this application. For example, the hash algorithm may be a BKDR hash algorithm. The BKDR hash algorithm comes from a book of C language programming co-authored by Kernighan and Dennis Ritchie, and is a short form of a combination of names of the two people. An example of performing a hash operation by using the BKDR hash algorithm is as follows:

```
unsigned int BKDRhash(TYPE key)
{
unsigned int hash = 0;
while(*key != 0) hash = hash * 31 + (*key++);
return hash % M; // M is a mode, that is, a quantity of buckets
}
```

Figure 3:
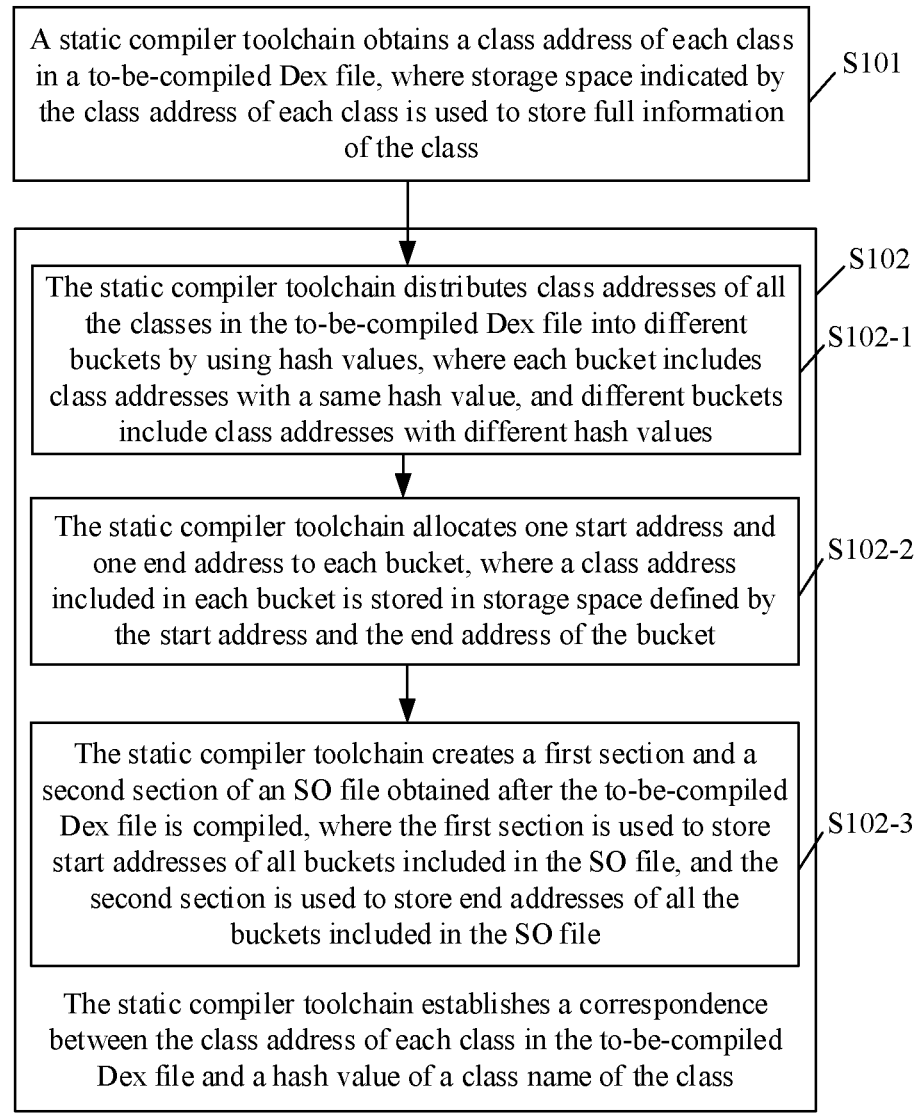
FIG. 3 is a schematic diagram of a hash table establishment method according to an embodiment of this application.

Optionally, as shown in FIG. 3, a process of establishing the hash table may include the following steps.

S101: The static compiler toolchain generates a class address of each class in a to-be-compiled Dex file. Storage space indicated by the class address of each class is used to store full information of the class. One Dex file may include one or more classes.

In some embodiments of this application, each class corresponds to one class address. The class address may be a virtual address (namely, a logical address) or a physical address. This is not specifically limited in this embodiment of this application.

S102: The static compiler toolchain establishes a correspondence between the class address of each class in the to-be-compiled Dex file and a hash value of a class name of the class. Based on this, full information of a to-be-loaded class may be subsequently searched for through addressing.

Optionally, S102 may include the following steps S102-1 to S102-3.

S102-1: The static compiler toolchain distributes class addresses of all the classes in the to-be-compiled Dex file into different buckets by using hash values. Each bucket includes class addresses with a same hash value, and different buckets include class addresses with different hash values. A hash value of a class address is a hash value of a class name included in class information stored in storage space represented by the class address.

In other words, the static compiler toolchain establishes the correspondence between the class address of each class and the hash value of the class name of the class by establishing a correspondence between a class address and a bucket to which the class address belongs and a correspondence between a bucket and a hash value.

For example, the static compiler toolchain may use a fixed quantity of buckets, and consecutively store all the buckets in ascending order of hash values corresponding to the buckets.

For ease of description, the following uses this as an example for description.

For example, for a plurality of buckets, the static compiler toolchain may number the buckets in ascending order of hash values corresponding to the buckets. For ease of description, the following uses this as an example for description.

S102-2: The static compiler toolchain allocates one start address and one end address to each bucket, where a class address included in each bucket is stored in storage space defined by the start address and the end address of the bucket.

For example, assuming that all the buckets are consecutively numbered from 0, for a bucket m (that is, a bucket numbered m), if m=0, a start address of the bucket 0 is a start address of all the buckets, and an end address of the bucket 0 is determined based on a quantity of class addresses included in the bucket 0; if m>0, a start address of the bucket m is determined based on an end address of a bucket (m−1), and an end address of the bucket m is determined based on a quantity of class addresses included in the bucket m, where 0≤m≤M−1, M is a quantity of buckets, and both m and M are integers.

For ease of description, in this embodiment of this application, an example in which each bucket consecutively stores class addresses included in the bucket is used for description. In other words, if a bucket includes A class addresses, a difference between an end address and a start address of the bucket is A, where A is an integer greater than or equal to 0. Certainly, this embodiment of this application is not limited thereto.

S102-3: The static compiler toolchain creates a first section and a second section of an SO file obtained after the to-be-compiled Dex file is compiled. The first section is used to store start addresses of all buckets included in the SO file. The second section is used to store end addresses of all the buckets included in the SO file.

For example, numbers of buckets to which start addresses stored in the first section belong are consecutively arranged in ascending order, and numbers of buckets to which end addresses stored in the second section belong are consecutively arranged in ascending order.

Figure 4:
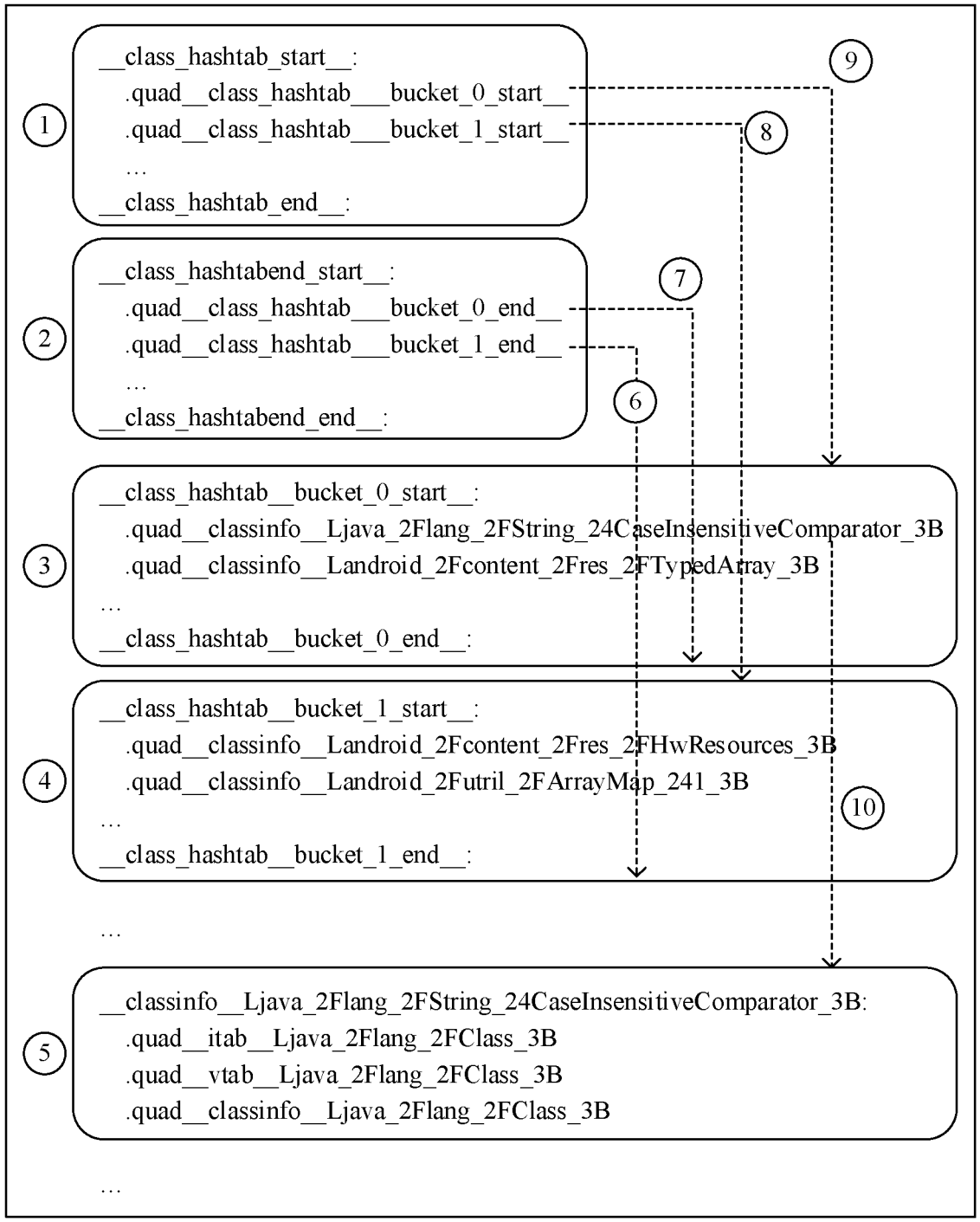
FIG. 4 is a schematic diagram of a hash table generated based on a class name according to an embodiment of this application.

Each SO file is essentially one Elf file, including an Elf header (header) and a plurality of sections, where each SO file includes one hash table such as a hash table shown in FIG. 4.

FIG. 4 is a schematic diagram of a hash table generated based on a class name according to an embodiment of this application. The hash table shown in FIG. 4 is a hash table in an SO file. ① indicates a first section of the SO file, ② indicates a second section of the SO file, ③ indicates a bucket 0, and ④ indicates a bucket 1. A bucket m corresponds to a hash value m. If the bucket 0 includes 11 class addresses, and the bucket 1 includes 10 class addresses, a start address "_class_hashtab_bucket_0_start_" of the bucket 0 may be an address 0, and an end address "_class_hashtab_bucket_0_end_" of the bucket 0 may be an address 10. Correspondingly, a start address "_class_hashtab_bucket_1_start_" of the bucket 1 may be an address 11, and an end address "_class_hashtab_bucket_1_end_" of the bucket 1 may be an address 21. ⑤ indicates full information of classes stored in storage space indicated by the first class address in the bucket 0, specifically including class names (for example, "_classinfo_Ljava_2Flang_2FString_24CaseInsensitive Comparator_3B") and other information. With reference to FIG. 4, it may be considered that the hash table described in this embodiment of this application includes each class in one SO file and an organization relationship of the class.

It should be noted that in some embodiments, in the static compilation phase, a quantity of buckets is determined, for example, the quantity of buckets is determined based on a quantity of classes included in an SO file. In other embodiments, a quantity of buckets, a correspondence between a bucket and a class address, and the like are determined in the application program start phase or the application program running phase. For example, an SO file that includes a relatively large quantity of classes corresponds to a relatively large quantity of buckets. Therefore, a collision rate is reduced for the SO file that includes a relatively large quantity of classes. A larger quantity of classes included in a same bucket indicates a higher collision rate.

It may be understood that the SO file obtained through compilation in the static compilation phase is usually stored in an external storage of a computer device.

Application Program Start Phase

Figure 5:
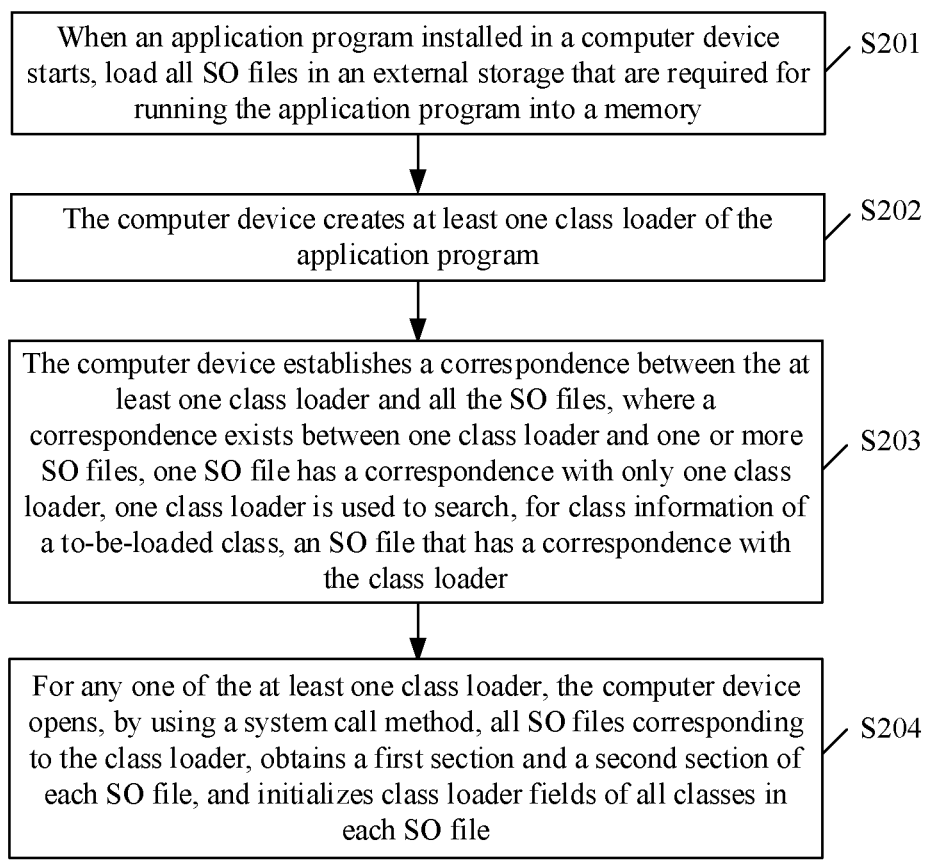
FIG. 5 is a schematic diagram of steps performed by a computer device in an application program start phase according to an embodiment of this application.

For example, as shown in FIG. 5, in the application program start phase, the computer device may perform the following steps.

S201: When an application program installed on the computer device starts, load all SO files in the external storage that are required for running the application program into a memory. For example, with reference to FIG. 2, a DMA processor in the computer device loads all the SO files stored in the external storage that are required for running the application program into the memory through one or more times of loading.

The application program may include a system service process, an application (application, APP), or the like.

S202: The computer device creates at least one class loader of the application program, for example, usually creates a plurality of class loaders.

For example, with reference to FIG. 2, S202 may be specifically performed by a CPU in the computer device.

For a specific implementation of creating a class loader for an application program, refer to the conventional technology (for example, an existing technology based on an Art running mode). Optionally, if a plurality of class loaders are created for the application program, the computer device may further create a parent-child relationship between the plurality of class loaders. For a specific implementation process, refer to the conventional technology (for example, the existing technology based on the Art running mode).

S203: The computer device establishes a correspondence between the at least one class loader and all the SO files. A correspondence exists between one class loader and one or more SO files, and one SO file has a correspondence with only one class loader. One class loader is used to search, for class information of the to-be-loaded class, an SO file that has a correspondence with the class loader.

For a specific implementation of the correspondence that is between the at least one class loader of the application program and all the SO files required for running the application program and that is established by the computer device, refer to an established correspondence between the at least one class loader of the application program and all Dex files required for running the application program in the conventional technology (for example, the existing technology based on the Art running mode). Specifically, if a class loader i in the at least one class loader corresponds to a Dex file j in all the Dex files, the class loader i corresponds to an SO file j. The SO file j is an SO file obtained by compiling the Dex file j in a static compilation period, $1 \leq i \leq I$, $1 \leq j \leq J$, I is a quantity of class loaders of the application program that are created by the computer device, and J is a quantity of all the SO files (or Dex files) required for running the application program by the computer device, I, J, i, and j are integers, and I<J.

S204: For any one of the at least one class loader, the computer device opens, by using a system call method, all SO files corresponding to the class loader, obtains a first section (for example, _class_hashtab_start_ in FIG. 4) and a second section (for example, _class_hashtabend_start_ in FIG. 4) of each SO file, and initializes class loader fields of all classes in each SO file. This step is a preparation for performing class loading when the application program runs.

Figure 7:
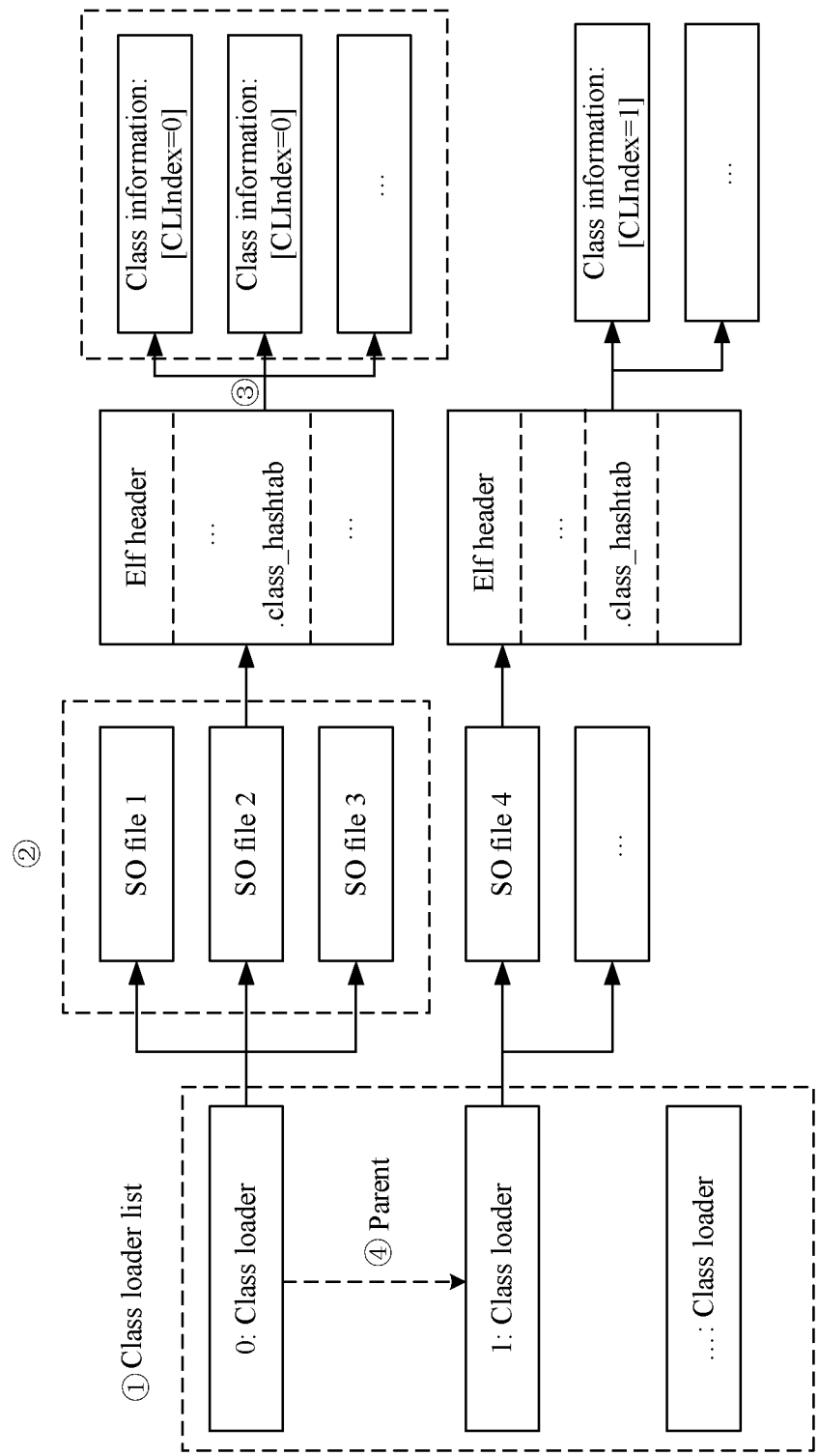
FIG. 7 is a schematic diagram of a correspondence between a class loader, an SO file, and a class loader field according to an embodiment of this application.

For example, as shown in FIG. 7, a sequence number of each class loader created by the computer device may be stored in a class loader list ①, sequence numbers start from 0, and there may be a parent-child relationship between the class loaders. For example, ④ in the figure indicates that a parent of a class loader 0 is a class loader 1. In an example for description in FIG. 7, the class loader 0 corresponds to three SO files, for example, an SO file 1, an SO file 2, and an SO file 3 indicated in ② in the figure. Each SO file may include an Elf header and a hash table. ".class_hashtab" in FIG. 7 indicates a hash table.

Class information of each class may further include a class loader field, as shown in ③ in FIG. 7. Information in a class loader field of a class may be used to indicate a sequence number, in the class loader list ①, of a class loader to which the class belongs. For example, CLIndex=0 (that is, an index or a number of a class loader is 0) is set in class loader fields of all classes in the SO file 2 in FIG. 7. A class loader to which a class belongs is a class loader corresponding to an SO file to which the class belongs.

S201 to S204 may be considered as a preparation phase for performing the class loading method. Based on this, the class loading method subsequently performed is specifically a method for querying a class in the memory. In this way, search (or class loading) efficiency can be improved, so that a search (or class loading) time is shortened. It should be noted that the class loading method may be performed in the application program start phase and/or running phase. In the following descriptions, an example in which the class loading method is performed in the application program running phase is used.

Application Program Running Phase

Figure 6:
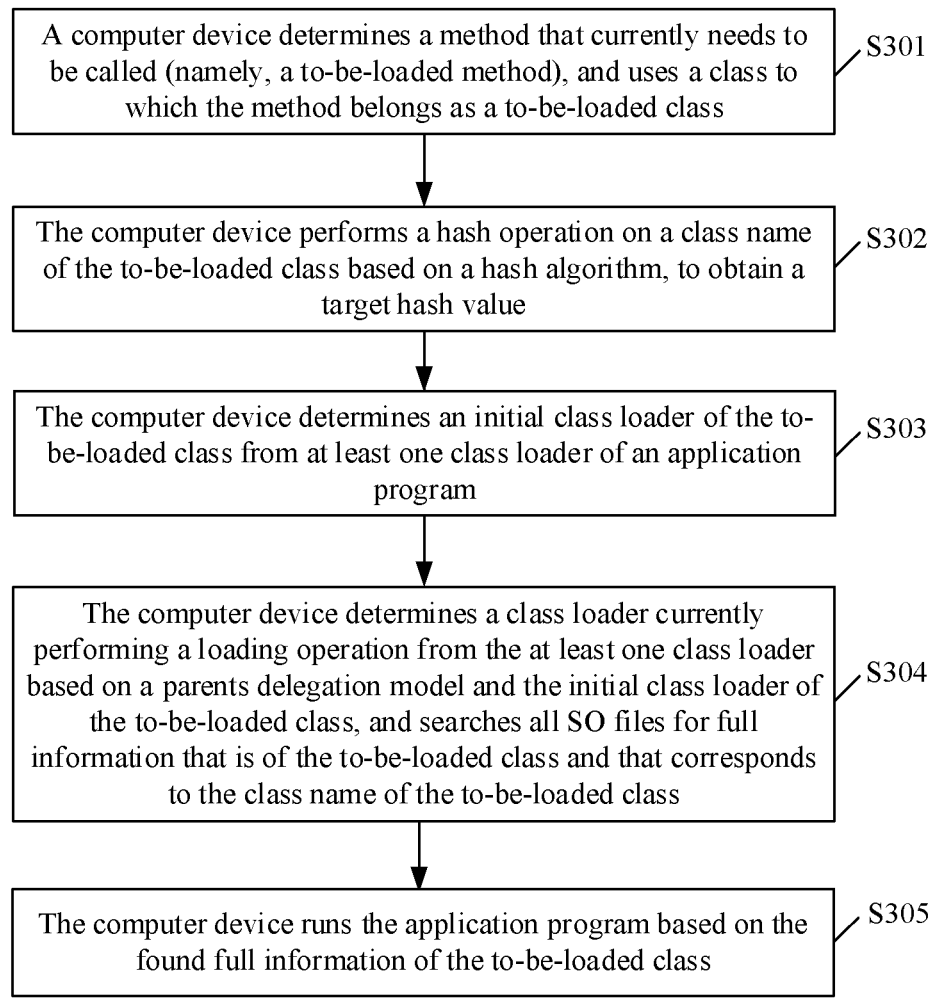
FIG. 6 is a schematic diagram of steps performed by a computer device in an application program running phase according to an embodiment of this application.

For example, as shown in FIG. 6, in the application program running phase, the computer device may perform the following steps.

S301: The computer device determines a method that currently needs to be called (namely, a to-be-loaded method), and uses a class to which the method belongs as the to-be-loaded class.

S302: The computer device performs a hash operation on a class name of the to-be-loaded class based on a hash algorithm, to obtain a target hash value.

The hash algorithm used in S302 is the same as the hash algorithm used in the foregoing static compilation phase.

S303: The computer device determines an initial class loader of the to-be-loaded class from the at least one class loader of the application program.

In some embodiments, the initial class loader may be explicitly indicated, for example, indicated by a user to the computer device.

In other embodiments, when the initial class loader is not explicitly indicated, this embodiment of this application provides the following implementations.

Manner 1: The computer device determines, based on the correspondence between the at least one class loader and all the SO files, a class loader corresponding to an SO file in which a target stack frame of a call stack of the to-be-loaded method is located, and uses the determined class loader as the initial class loader of the to-be-loaded class. The target stack frame is a stack frame for calling (for example, directly or indirectly calling) the to-be-loaded method.

For example, a method A needs to be called in a process of running the application program, a method B needs to be called in a process of performing the method A, and a method C needs to be called in a process of calling the method B. In this case, "method A→method B→method C" is a call stack, and each method in the call stack is one stack frame of the call stack. If the to-be-loaded method is the method C, the target stack frame may be a stack frame directly calling the method C, namely, the method B, or a stack frame indirectly calling the method C, namely, the method A.

It may be understood that the correspondence between the at least one class loader of the application program and all the SO files required for running the application program is established in S203. In specific implementation, a path of an SO file may be used as identification information of the SO file. Therefore, in an implementation, a correspondence between a class loader and an SO file may include a correspondence between the class loader and a path of the SO file. Based on this, Manner 1 may be described as follows: The computer device determines, based on a correspondence between the at least one class loader and paths of all the SO files, a class loader corresponding to a path of the SO file in which the target stack frame is located, and uses the determined class loader as the initial class loader.

Manner 2: The computer device uses, as the initial class loader of the to-be-loaded class, a class loader corresponding to a caller of the to-be-loaded class. The caller of the to-be-loaded class refers to a class currently calling the to-be-loaded class.

In S204, class loader fields of all classes in each SO file are initialized, in other words, a correspondence between the at least one class loader and classes in all the SO files is established. A correspondence exists between a class loader and a class included in an SO file corresponding to the loader. In the technical solution provided in Manner 2, a class loader indicated by a class loader field corresponding to the caller of the to-be-loaded class may be used as the initial class loader of the to-be-loaded class.

It should be noted that in the technology based on the Art running mode, an initial class loader is usually obtained by using a back stack (back stack). The back stack is a stack in a call stack obtaining a current to-be-loaded method. However, there are specific time overheads in the back stack. Therefore, in some embodiments of this application, directly using, as the initial class loader, the class loader corresponding to the caller of the to-be-loaded class can avoid time overheads caused by triggering the back stack when the application program runs. If back stack trigger frequency is higher, using Manner 2 can save a longer CPU running time.

Figure 8:
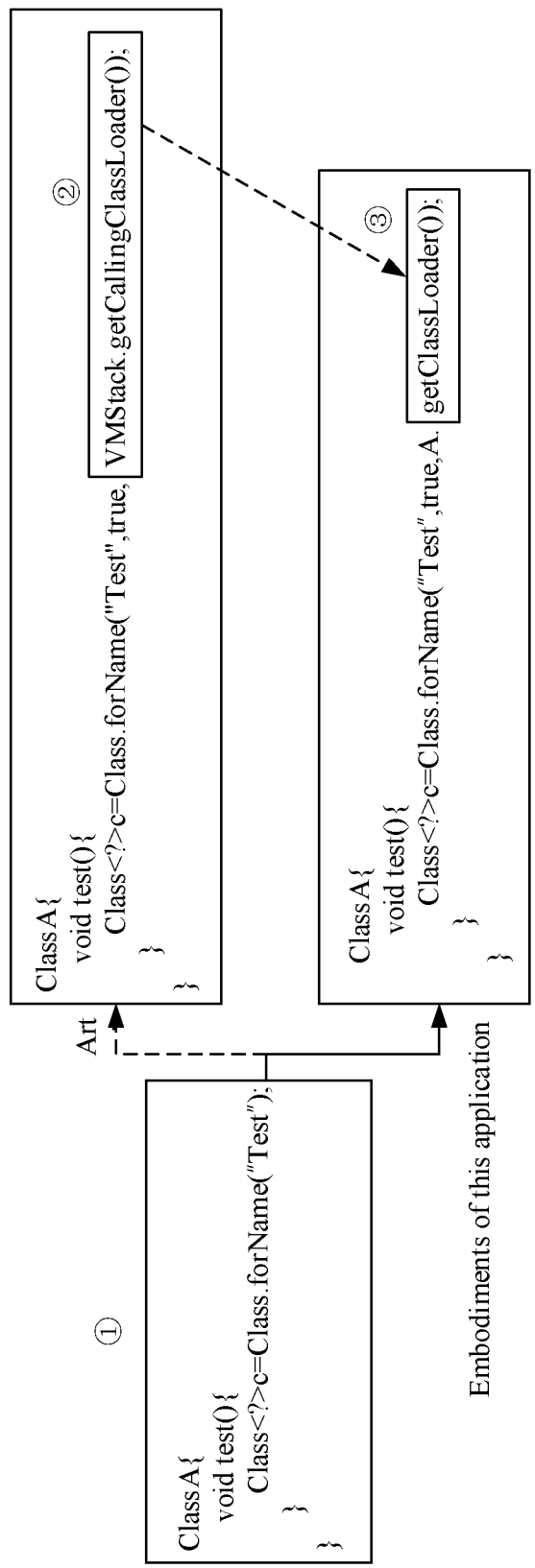
FIG. 8 is a schematic diagram of comparison of determining an initial class loader to be used in a parents delegation model according to an embodiment of this application.

Class.forName( ) is used as an example. Assuming that a test class needs to be loaded in a class A by using the Class.forName( ) method (as shown in ① in FIG. 8), and no initial class loader is specified. In the technology based on the Art running mode, an initial class loader is obtained by using VMStack.getCallingClassLoader( ) when the application program runs (as shown in ② in FIG. 8). This method is implemented by using the back stack. In this embodiment of this application, a class loader field of each class (including the class A) is defined in the static compilation phase, for example, A.getClassLoader( ) in ③ shown in FIG. 8. In addition, because the class loader field of each class is initialized before class loading is performed, when no initial class loader is specified, A.getClassLoader( ) may be directly called, in other words, a class loader indicated by an initial value of a specified class loader field may be used as the initial class loader. The specified class loader field is a class loader field corresponding to the caller of the to-be-loaded class. This is much faster than performance of the back stack. In other words, class loading performance is improved by replacing ③ with ② shown in FIG. 8.

S304: The computer device determines a class loader currently performing a loading operation from the at least one class loader based on a parents delegation model and the initial class loader of the to-be-loaded class, and searches all the SO files for the full information that is of the to-be-loaded class and that corresponds to the class name of the to-be-loaded class.

TheArt running mode is used as an example. A parental delegation mechanism in the conventional technology includes the following:

(1) When a to-be-loaded class needs to be loaded, trigger a class loading request, determine whether the to-be-loaded class is loaded, and if the to-be-loaded class is loaded (in other words, class information of the to-be-loaded class is stored in the memory), directly return a class object.

(2) If the to-be-loaded class is not loaded, determine, according to the following rule, a class loader currently performing a loading operation: The class loading request is preferentially entrusted to a parent class loader of an initial class loader for execution, and is further entrusted to an upper layer if the parent class loader still has a parent class loader, and so on, so that the class loading request finally reaches a bootstrap class loader at the top layer. If the parent class loader can complete a class loading task, successfully return a class object. If the parent class loader cannot complete a loading task, a child loader tries to execute the load task.

Based on S201, it can be learned that in some embodiments of this application, when the application program starts, all the SO files required for running the application program are loaded into the memory. Based on this, in S304, the determining a class loader currently performing a loading operation from the at least one class loader based on a parents delegation model may include: when the to-be-loaded class needs to be loaded, triggering a class loader request, and determining the class loader currently performing a loading operation from the at least one class loader according to the rule in (2). Based on this, S304 may be used as a variant (or evolved or new) parents delegation model.

S305: The computer device runs the application program based on the found full information of the to-be-loaded class.

Figure 9:
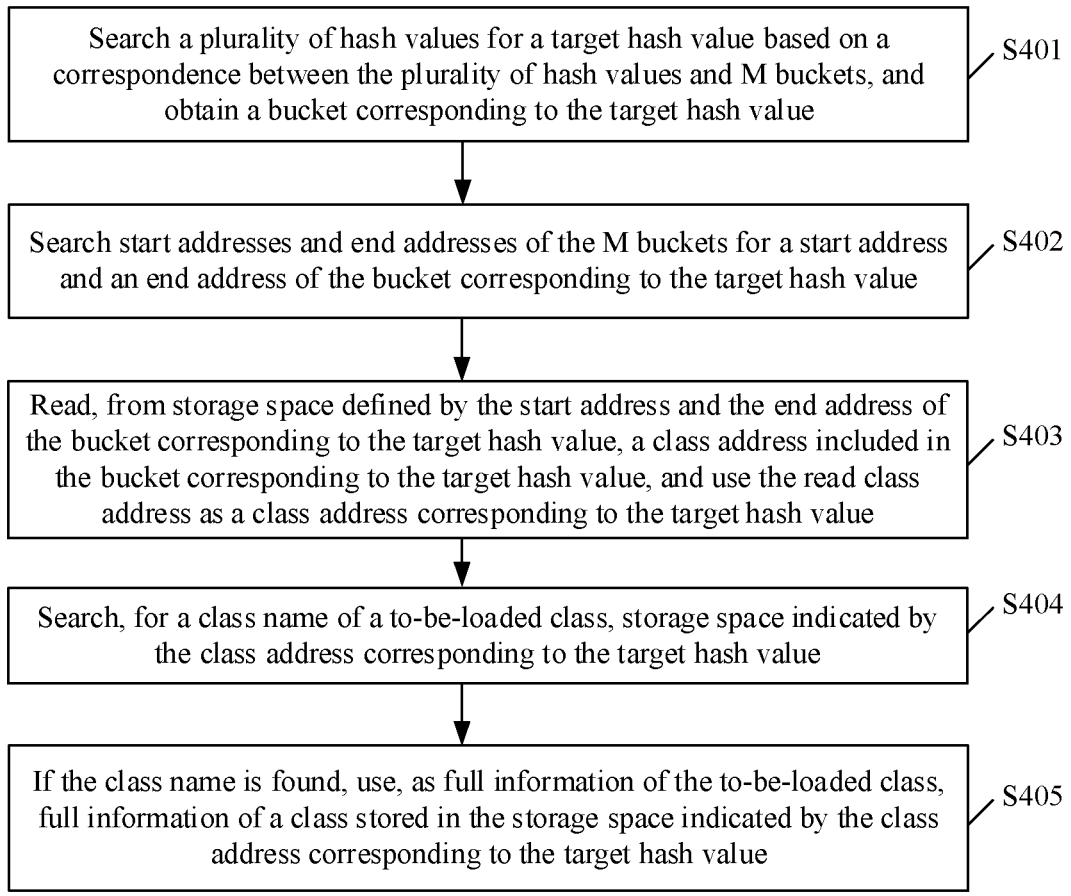
FIG. 9 is a schematic flowchart of a class loading method according to an embodiment of this application.

In specific implementation, loading a class based on a class loader is essentially searching, for a to-be-loaded class, all SO files managed by the class loader. For any SO file, the computer device may perform the following steps based on a class loader corresponding to the SO file, to search for the full information of the to-be-loaded class, as shown in FIG. 9.

S401: Search a plurality of hash values for the target hash value based on a correspondence between the plurality of hash values and M buckets, and obtain a bucket corresponding to the target hash value. For example, the plurality of hash values are searched for the target hash value based on a correspondence between the plurality of hash values and numbers of the M buckets, and obtain a number of the bucket corresponding to the target hash value.

For example, assuming that the target hash value is H, the bucket corresponding to the target hash value is the $(H+1)^{th}$ bucket in the M buckets.

S402: Search start addresses and end addresses of the M buckets for a start address and an end address of the bucket corresponding to the target hash value.

Based on the example in S401, starting from the first address of the first section of the SO file (that is, the start address of the bucket 0), the start address of the bucket corresponding to the target hash value is obtained by using the target hash value H as an offset. Similarly, starting from the first address of the second section of the SO file (that is, the end address of the bucket 0), the end address of the bucket corresponding to the target hash value is obtained by using the target hash value H as an offset.

S403: Read, from storage space defined by the start address and the end address of the bucket corresponding to the target hash value, a class address included in the bucket corresponding to the target hash value, and use the read class address as a class address corresponding to the target hash value.

Based on the example in S402, assuming that the bucket corresponding to the target hash value H is the bucket 0, the class address included in the bucket corresponding to the target hash value may be determined based on ⑨ and ⑦ shown in FIG. 4. Assuming that the bucket corresponding to the target hash value H is the bucket 1, the class address included in the bucket corresponding to the target hash value may be determined based on ⑧ and ⑥ shown in FIG. 4.

S404: Search, for the class name of the to-be-loaded class, storage space indicated by the class address corresponding to the target hash value. The class name of the to-be-loaded class is a part of the full information of the to-be-loaded class.

Based on the example in S403, assuming that the bucket corresponding to the target hash value H is the bucket 0, the storage space indicated by the class address corresponding to the target hash value may be determined based on ⑩ shown in FIG. 4. It is determined whether a class name stored in the storage space matches the class name of the to-be-loaded class. If the class names are the same, it is considered that the class names match (in other words, the class name is found); otherwise, it is considered that the class names do not match (in other words, the class name is not found).

S405: If the class name is found, use, as the full information of the to-be-loaded class, full information of a class stored in the storage space indicated by the class address corresponding to the target hash value.

It may be understood that if the class name is not found, it indicates that the SO file does not store the class information of the to-be-loaded class, a next SO file corresponding to the class loader is searched for the full information of the to-be-loaded class. If the full information of the to-be-loaded class cannot be found after all SO files corresponding to the class loader are traversed, based on the parents delegation model, a next class loader continues to be responsible for searching, until the full information of the to-be-loaded class is found. If the full information of the to-be-loaded class cannot be found after all class loaders of the application program are traversed, the computer device outputs exception handling information.

One difference between the technical solutions provided in this application and the technology based on the Art running mode lies in that a correspondence between a class name and full information of a class is established in a static compilation phase in this application, and a correspondence between a class name and a class definition is established in the technology based on the Art running mode. Based on this, it can be learned that when class loading is performed, full information corresponding to a class name may be directly found based on the class name. However, in the technology based on the Art running mode, only a class definition corresponding to the class name can be found based on the class name, subsequently, class data may be loaded based on a dynamically allocated memory, and information such as a class attribute and a method may be filled through dynamic linking. Therefore, compared with the technology based on the Art running mode, the technical solutions provided in this application can perform class loading more quickly.

In addition, in some embodiments of this application, when an application program starts, all SO files required for running the application program are loaded into the memory. In this way, when the application program runs, class loading is essentially searching the memory for a class, so that a class loading rate can be further improved. In particular, when class information is first loaded, the technical solutions provided in this application can accelerate running of a system and an application compared with the technology based on the Art running mode.

In addition, the technical solutions provided in some embodiments of this application allow class loading to be performed after a Dex file is converted into an SO file through a static compilation technology in an Android operating system, to implement a set of class loading mechanisms compatible with normal running of the Android operating system.

The foregoing mainly describes the solutions provided in the embodiments of this application from the perspective of the method. To implement the foregoing functions, hardware structures and/or software modules corresponding to the functions are included. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, a class loading apparatus may be divided into function modules based on the foregoing method examples. For example, function modules may be obtained through division based on corresponding functions, or two or more functions may be integrated into one processing module. The integrated module may be implemented in a form of hardware, or may be implemented in a form of a software functional module. It should be noted that in the embodiments of this application, module division is an example, and is merely logical function division. In actual implementation, another division manner may be used.

Figure 10:
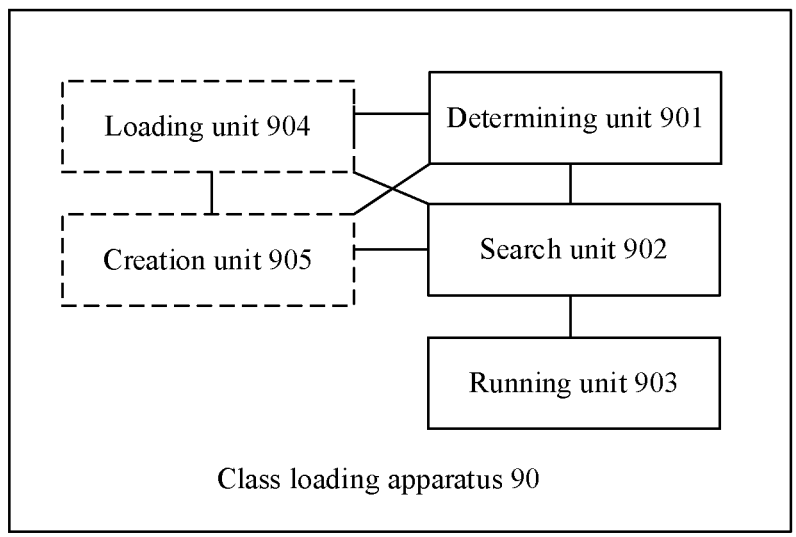
FIG. 10 is a schematic structural diagram of a class loading apparatus according to an embodiment of this application.

FIG. 10 is a schematic structural diagram of a class loading apparatus 90 according to an embodiment of this application. The apparatus 90 may be configured to perform the method shown in FIG. 6, FIG. 8, or FIG. 9. For example, the apparatus 90 may be the foregoing computer device.

The apparatus 90 may include a target binary file, the target binary file includes a correspondence between class names of a plurality of classes and full information of the plurality of classes, and the class names are in a one-to-one correspondence with the full information of the classes. The apparatus 90 includes a determining unit 901, a search unit 902, and a running unit 903. The determining unit 901 is configured to determine a class name of a to-be-loaded class required when an application program in the apparatus 90 runs. The search unit 902 is configured to: search the class names of the plurality of classes for the class name of the to-be-loaded class based on the correspondence between the class names of the plurality of classes and the full information of the plurality of classes, and obtain full information corresponding to the class name of the to-be-loaded class, where the plurality of classes include a first class, and full information of the first class is all information required for running the first class. The running unit 903 is configured to run the application program based on the full information corresponding to the class name of the to-be-loaded class. For example, with reference to FIG. 6, the determining unit 901 may be specifically configured to perform S301, the search unit 902 may be specifically configured to perform S302 to S304, and the running unit 903 may be specifically configured to perform S305.

Optionally, the target binary file further includes class addresses of the plurality of classes and a correspondence between the class addresses of the plurality of classes and hash values of the class names of the plurality of classes, and storage space indicated by a class address of a class is used to store full information of the class. Correspondingly, the search unit 902 is further configured to: search the hash values of the class names of the plurality of classes for a target hash value based on the correspondence between the class addresses of the plurality of classes and the hash values of the class names of the plurality of classes, and obtain a class address corresponding to the target hash value, where the target hash value is a hash value of the class name of the to-be-loaded class. In the aspect of searching the class names of the plurality of classes for the class name of the to-be-loaded class based on the correspondence between the class names of the plurality of classes and the full information of the plurality of classes, and obtaining the full information corresponding to the class name of the to-be-loaded class, the search unit 902 is specifically configured to: search, for the class name of the to-be-loaded class, storage space indicated by the class address corresponding to the target hash value, where the class name of the to-be-loaded class is a part of the full information of the to-be-loaded class; and use, as the full information of the to-be-loaded class, full information in the storage space indicated by the class address corresponding to the target hash value. For example, with reference to FIG. 9, the search unit 902 may be specifically configured to perform S403 to S405.

Optionally, one hash value corresponds to one bucket, and one bucket includes zero, one, or more class addresses; and in the aspect of searching the hash values of the class names of the plurality of classes for the target hash value based on the correspondence between the class addresses of the plurality of classes and the hash values of the class names of the plurality of classes, and obtaining the class address corresponding to the target hash value, the search unit 902 is specifically configured to: search the hash values of the class names of the plurality of classes for the target hash value based on a correspondence between a plurality of buckets and the hash values of the class names of the plurality of classes, obtain a bucket corresponding to the target hash value, and use, as the class address corresponding to the target hash value, a class address included in the bucket corresponding to the target hash value. For example, with reference to FIG. 9, the search unit 902 may be specifically configured to perform S403.

Optionally, one bucket has one start address and one end address, the plurality of buckets include a first bucket, and storage space defined by a start address and an end address of the first bucket is used to store a class address included in the first bucket. Correspondingly, the search unit 902 is further configured to: search start addresses and end addresses of the plurality of buckets for a start address and an end address of the bucket corresponding to the target hash value; and read, from storage space defined by the start address and the end address of the bucket corresponding to the target hash value, the class address included in the bucket corresponding to the target hash value. For example, with reference to FIG. 9, the search unit 902 may be specifically configured to perform S401 and S402.

Optionally, the apparatus 90 further includes a loading unit 904, configured to load the binary files required for running the application program from an external storage of the apparatus 90 into a memory of the apparatus 90, where all the binary files include the target binary file.

Optionally, the apparatus 90 further includes a creation unit 905, configured to: create at least two class loaders of the application program, and establish a correspondence between the at least two class loaders and all the binary files, where the at least two class loaders include a first class loader, and the first class loader is used to search, for the full information of the to-be-loaded class, a binary file corresponding to the first class loader. For example, with reference to FIG. 5, the creation unit 905 may be configured to perform S202 and S203.

Optionally, the determining unit 901 is further configured to determine a class loader currently performing a search operation from the at least two class loaders based on a parents delegation model, to search, for the full information of the to-be-loaded class by using the determined class loader currently performing a search operation, all the binary files required for running the application program. For example, with reference to FIG. 6, the determining unit 901 may be configured to perform S303.

Optionally, that a correspondence exists between a class loader and a binary file includes that a correspondence exists between the class loader and a path of the binary file; and correspondingly, the search unit 902 is further configured to:

search, based on a correspondence between the at least two class loaders and paths of all the binary files, the paths of all the binary files for a path of a binary file in which a target stack frame is located, obtain a class loader corresponding to the path of the binary file in which the target stack frame is located, and use the determined class loader as an initial class loader to be used in the parents delegation model, where the target stack frame is a stack frame for calling a to-be-loaded computer device, and the to-be-loaded computer device belongs to the to-be-loaded class. For example, with reference to FIG. 6, the determining unit 901 may be configured to perform S303.

Optionally, the creation unit 905 is further configured to establish a correspondence between the at least two class loaders and classes in all the binary files, where a correspondence exists between the first class loader and a class included in the binary file corresponding to the first class loader; and the determining unit 901 is further configured to use, as an initial class loader to be used in the parents delegation model, a class loader corresponding to a class currently calling the to-be-loaded class.

Optionally, the binary file includes an SO file.

Any apparatus 90 described above may be configured to perform corresponding steps in the foregoing method embodiments. Therefore, for explanations and beneficial effects of related content of the apparatus 90, refer to corresponding descriptions in the foregoing method embodiments. Details are not described herein again.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

The foregoing descriptions are merely specific implementations of this application. Changes or replacements that can be figured out by a person skilled in the art based on the specific implementations provided in this application shall fall within the protection scope of this application.

What is claimed is:

1. A class loading method, applied to a computer device, wherein the method comprises:

obtaining a class name of a to-be-loaded class required for running an application program by the computer device;

obtaining full information corresponding to the class name of the to-be-loaded class based on the class name of the to-be-loaded class and a correspondence between class names of a plurality of classes and full information of the plurality of classes, wherein the class names of the plurality of classes are in a one-to-one correspondence with the full information of the plurality of classes and the correspondence is stored in a target binary file; and running the application program based on the full information corresponding to the class name of the to-be-loaded class;

wherein the target binary file further comprises class addresses of the plurality of classes and a correspondence between the class addresses of the plurality of classes and hash values of the class names of the plurality of classes, storage space indicated by a class address of a class is used to store full information of the class, and the method further comprises:

obtaining a class address corresponding to a target hash value based on the target hash value and the correspondence between the class addresses of the plurality of classes and the hash values of the class names of the plurality of classes, wherein the target hash value is a hash value of the class name of the to-be-loaded class; and the obtaining of the class address corresponding to the target hash value comprises:

searching, for the class name of the to-be-loaded class, storage space indicated by the class address corresponding to the target hash value, wherein the class name of the to-be-loaded class is a part of the full information of the to-be-loaded class; and using, as the full information of the to-be-loaded class, full information in the storage space indicated by the class address corresponding to the target hash value.

2. The method according to claim 1, wherein one hash value corresponds to one bucket, and one bucket comprises one or more class addresses; and the obtaining a class address corresponding to the target hash value comprises:

obtaining a bucket corresponding to the target hash value based on the target hash value and a correspondence between a plurality of buckets and the hash values of the class names of the plurality of classes, and using, as the class address corresponding to the target hash value, a class address comprised in the bucket corresponding to the target hash value.

3. The method according to claim 2, wherein one bucket has one start address and one end address, and before the using, as the class address corresponding to the target hash value, a class address comprised in the bucket corresponding to the target hash value, the method further comprises:

searching start addresses and end addresses of the plurality of buckets for a start address and an end address of the bucket corresponding to the target hash value; and reading, from a storage space defined by the start address and the end address of the bucket corresponding to the target hash value, the class address comprised in the bucket corresponding to the target hash value.

4. The method according to claim 1, wherein before determining a class name of a to-be-loaded class required for running an application program in the computer device, the method further comprises:

loading binary files required for running the application program from an external storage of the computer device into a memory of the computer device, wherein the binary files comprise the target binary file.

5. The method according to claim 4, wherein the method further comprises:

creating at least two class loaders of the application program; and establishing a correspondence between the at least two class loaders and the binary files, wherein the at least two class loaders comprise a first class loader, and the first class loader is used to search, for the full information of the to-be-loaded class, a binary file corresponding to the first class loader.

6. The method according to claim 5, wherein the method further comprises:

determining a class loader currently performing a search operation from the at least two class loaders based on a parents delegation model, to search the binary files for the full information of the to-be-loaded class by using the determined class loader currently performing a search operation.

7. An apparatus for class loading, wherein the apparatus comprises:

a processor, and a memory coupled to the processor and configured to store a plurality of instructions that, when executed by the processor, causes the processor to:

obtain a class name of a to-be-loaded class required for running an application program in a computer device;

obtain full information corresponding to the class name of the to-be-loaded class based on the class name of the to-be-loaded class and a correspondence between the class names of the plurality of classes and full information of the plurality of classes, wherein the class names are in a one-to-one correspondence with the full information of the plurality of classes and the correspondence is stored in a target binary file; and run the application program based on the full information corresponding to the class name of the to-be-loaded class;

wherein the target binary file further comprises class addresses of the plurality of classes and a correspondence between the class addresses of the plurality of classes and hash values of the class names of the plurality of classes, a storage space indicated by a class address of a class is used to store full information of the class, wherein the instructions further cause the processor to:

obtain a class address corresponding to a target hash value based on the target hash value and the correspondence between the class addresses of the plurality of classes and the hash values of the class names of the plurality of classes, wherein the target hash value is a hash value of the class name of the to-be-loaded class; and when performing the obtaining step of the class address, the instructions cause the processor to:

search, for the class name of the to-be-loaded class, storage space indicated by the class address corresponding to the target hash value, wherein the class name of the to-be-loaded class is a part of the full information of the to-be-loaded class; and use, as the full information of the to-be-loaded class, full information in the storage space indicated by the class address corresponding to the target hash value.

8. The apparatus of claim 7, wherein one hash value corresponds to one bucket, and one bucket comprises one or more class addresses; and when processing the obtaining a class address corresponding to the target hash value step, the instructions cause the processor to:

obtain a bucket corresponding to the target hash value based on the target hash value and a correspondence between a plurality of buckets and the hash values of the class names of the plurality of classes, and using, as the class address corresponding to the target hash value, a class address comprised in the bucket corresponding to the target hash value.

9. The apparatus of claim 8, wherein one bucket has one start address and one end address, and before using, as the class address corresponding to the target hash value, the class address comprised in the bucket corresponding to the target hash value, the instructions further cause the processor to:

search start addresses and end addresses of the plurality of buckets for a start address and an end address of the bucket corresponding to the target hash value; and read, from a storage space defined by the start address and the end address of the bucket corresponding to the target hash value, the class address comprised in the bucket corresponding to the target hash value.

10. The apparatus of claim 7, the instructions further cause the processor to:

load binary files required for running the application program from an external storage of the computer device into a memory of the computer device, wherein the binary files comprise the target binary file.

11. The apparatus of claim 10, wherein the instructions further cause the processor to:

create at least two class loaders of the application program; and establish a correspondence between the at least two class loaders and the binary files, wherein the at least two class loaders comprise a first class loader, and the first class loader is used to search, for the full information of the to-be-loaded class, a binary file corresponding to the first class loader.

12. The apparatus of claim 11, wherein the instructions further cause the processor to:

determine the first class loader currently performing a search operation from the at least two class loaders based on a parents delegation model, to search the binary files for the full information of the to-be-loaded class by using the determined class loader currently performing a search operation.

13. A non-transitory computer storage medium, wherein the computer storage medium stores computer-executable instructions, which when the computer-executable instructions are invoked by a computer, cause the computer to perform a class loading method, wherein the method comprises:

obtaining a class name of a to-be-loaded class required for running an application program in the computer;

obtaining full information corresponding to the class name of the to-be-loaded class based on the class name of the to-be-loaded class and a correspondence between the class names of the plurality of classes and full information of the plurality of classes, wherein the class names are in a one-to-one correspondence with the full information of the classes and the correspondence is stored in a target binary file; and running the application program based on the full information corresponding to the class name of the to-be-loaded class;

wherein the target binary file further comprises class addresses of the plurality of classes and a correspondence between the class addresses of the plurality of classes and hash values of the class names of the plurality of classes, a storage space indicated by a class address of a class is used to store full information of the class, wherein the method further comprises:

obtaining a class address corresponding to the target hash value based on a target hash value and the correspondence between the class addresses of the plurality of classes and the hash values of the class names of the plurality of classes, wherein the target hash value is a hash value of the class name of the to-be-loaded class; and the obtaining of the class address corresponding to the target hash value comprises:

searching, for the class name of the to-be-loaded class, a storage space indicated by the class address corresponding to the target hash value, wherein the class name of the to-be-loaded class is a part of the full information of the to-be-loaded class; and using, as the full information of the to-be-loaded class, full information in the storage space indicated by the class address corresponding to the target hash value.

14. The computer storage medium of claim 13, wherein one hash value corresponds to one bucket, and one bucket comprises one or more class addresses; and the obtaining of a class address corresponding to the target hash value step comprises:

obtaining a bucket corresponding to the target hash value based on the target hash value and a correspondence between a plurality of buckets and the hash values of the class names of the plurality of classes, and using, as the class address corresponding to the target hash value, a class address comprised in the bucket corresponding to the target hash value.

15. The computer storage medium of claim 14, wherein one bucket has one start address and one end address, and before using, as the class address corresponding to the target hash value, the class address comprised in the bucket corresponding to the target hash value, the method further comprises:

searching start addresses and end addresses of the plurality of buckets for a start address and an end address of the bucket corresponding to the target hash value; and reading, from a storage space defined by the start address and the end address of the bucket corresponding to the target hash value, the class address comprised in the bucket corresponding to the target hash value.

16. The computer storage medium of claim 13, wherein the method further comprises:

loading binary files required for running the application program from an external storage of the computer device into a memory of the computer, wherein the binary files comprise the target binary file.

17. The computer storage medium of claim 13, wherein the method further comprises:

creating at least two class loaders of the application program; and establishing a correspondence between the at least two class loaders and the binary files, wherein the at least two class loaders comprise a first class loader, and the first class loader is used to search, for the full information of the to-be-loaded class, a binary file corresponding to the first class loader.

* * * * *

UNITED STATES PATENT AND TRADEMARK OFFICE
CERTIFICATE OF CORRECTION

| | | |
|---|---|---|
| PATENT NO. | : 11,755,341 B2 | |
| APPLICATION NO. | : 17/484137 | |
| DATED | : September 12, 2023 | |
| INVENTOR(S) | : Xinjian Wang et al. | |

It is certified that error appears in the above-identified patent and that said Letters Patent is hereby corrected as shown below:

In the Claims

In Column 20, Line 9, in Claim 1, delete "a" and insert -- the --.

Signed and Sealed this
Seventh Day of November, 2023

Katherine Kelly Vidal
*Director of the United States Patent and Trademark Office*